No. 621,968. Patented Mar. 28, 1899.
J. C. KURTZ.
FUEL GAS BURNER.
(Application filed June 15, 1898.)
(No Model.)
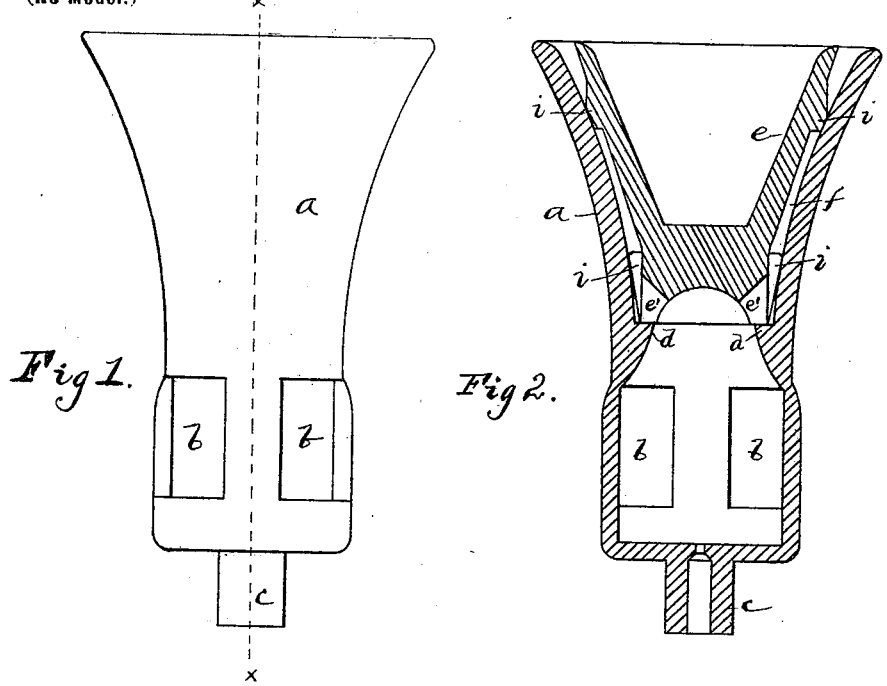
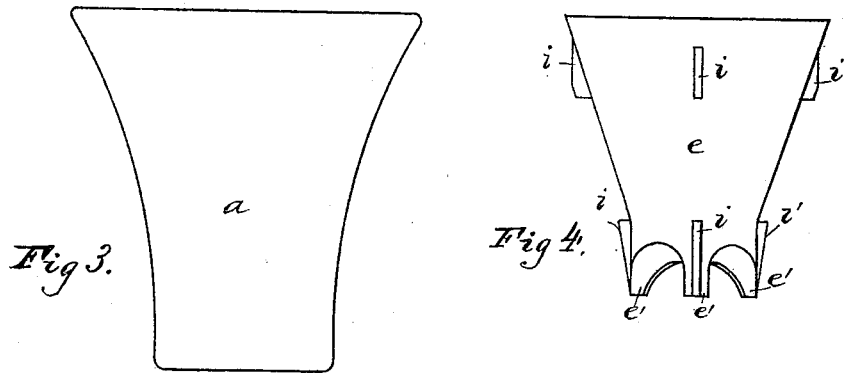
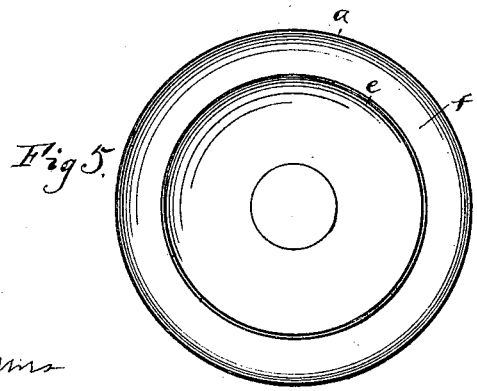
Witnesses:
W. F. Voss.
George Williams
Jno. C. Kurtz.
Inventor:
By R. J. McCarty
his Attorney.
THE NORRIS PETERS CO., PHOTO-LITHO., WASHINGTON, D. C.

UNITED STATES PATENT OFFICE.

JOHN C. KURTZ, OF DAYTON, OHIO.

FUEL-GAS BURNER.

SPECIFICATION forming part of Letters Patent No. 621,968, dated March 28, 1899.

Application filed June 15, 1898. Serial No. 683,481. (No model.)

*To all whom it may concern:*

Be it known that I, JOHN C. KURTZ, a citizen of the United States, residing at Dayton, in the county of Montgomery and State of Ohio, have invented certain new and useful Improvements in Fuel-Gas Burners; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to new and useful improvements in fuel-gas burners.

The object of the invention is to provide a burner of the above type consisting of two separate and disconnected parts or shells, one of which fits in the other, but has no connection therewith, as before stated, so that the parts of said burner may be easily separated for the purpose of cleaning.

In the accompanying drawings, Figure 1 is an elevation of my improved gas-burner. Fig. 2 is a vertical mid-sectional elevation. Fig. 3 is an elevation without the mixer shown in Fig. 1. Fig. 4 is an elevation of the inner shell removed. Fig. 5 is a top plan view of the burner intact.

The burner $a$, as shown in Figs. 1 and 2, has open spaces $b$ in its lower portion for the entry of air and a nipple $c$ for attachment with the service-pipe. This lower portion constitutes the mixer, immediately above which the interior of the burner projects inwardly and forms an annular ledge or seat $d$. The burner or outer shell $a$ may flare outwardly or partake of other forms; but in whatever form it may be made it is essential to provide the ledge $d$. This ledge supports an inner shell $e$, which conforms to the shape of the outer shell, both of which are of an oblong inverted-bell shape, and therewith provides a thin annular chamber $f$, that communicates with the top of the burner and into which the gas enters. The lower end of said shell $e$ terminates in three legs $e'$, which rest upon said ledge. The portion of the shell between these legs is hollowed out to permit of the passage of gas around said shell, and the said shell, through the passages between the legs, is maintained in a central position by means of lugs $i$ on the upper and lower portions thereof. The lower solid portion of the inner shell is of sufficient weight to maintain said shell on its seat during the emission of gas. The said shell may be easily removed by the fingers to clean the burner, there being no screw or other connection between the inner and outer shells.

I claim as my invention—

A fuel-gas burner, comprising an outer oblong inverted-bell-shaped shell provided with an interior annular ledge $d$ in a central part thereof, an inner oblong inverted-bell-shaped shell having its bottom hollowed out and provided with feet $e'$ projecting down from the sides thereof by which said inner shell is supported on the ledge $d$, and passages between said feet leading from the hollow space below to the annular space between said shells, the inner shell being of sufficient weight to maintain it on the ledge $d$ free from any attachment with the outer shell, and means for maintaining said inner shell in a central position, substantially as shown and described.

In testimony that I claim the foregoing as my own I hereunto affix my signature in presence of two witnesses.

JOHN C. KURTZ.

Witnesses:
 JOSEPH A. WORTMAN,
 R. J. MCCARTY.